(12) United States Patent
Abramov et al.

(10) Patent No.: US 7,729,662 B2
(45) Date of Patent: Jun. 1, 2010

(54) RADIO COMMUNICATION METHOD IN A WIRELESS LOCAL NETWORK

(75) Inventors: Oleg Jurievich Abramov, St. Petersburg (RU); Lev Grigorievich Burov, St. Petersburg (RU); Alexander Nikolaevich Kirdin, St. Petersburg (RU)

(73) Assignee: Airgain, Inc., Carlsbad, CA (US)

( * ) Notice: Subject to any disclaimer, the term of this patent is extended or adjusted under 35 U.S.C. 154(b) by 1087 days.

(21) Appl. No.: 10/575,546

(22) PCT Filed: Oct. 27, 2004

(86) PCT No.: PCT/RU2004/000436

§ 371 (c)(1), (2), (4) Date: Apr. 10, 2006

(87) PCT Pub. No.: WO2005/041440

PCT Pub. Date: Mar. 6, 2005

(65) Prior Publication Data

US 2007/0021069 A1    Jan. 25, 2007

(30) Foreign Application Priority Data

Oct. 27, 2003 (RU) .............................. 2003132289

(51) Int. Cl.
*H04B 1/00* (2006.01)
*H04B 15/00* (2006.01)

(52) U.S. Cl. ................ 455/63.4; 455/277.1; 455/277.2; 370/333; 370/334

(58) Field of Classification Search ................ 455/63.4, 455/277.1, 277.2; 370/333, 334
See application file for complete search history.

(56) References Cited

U.S. PATENT DOCUMENTS 5,303,240 A    4/1994    Borras et al.

(Continued)

FOREIGN PATENT DOCUMENTS

| EP | 1069706 A1 | 1/2001 |
| RU | 2207724 C1 | 6/2003 |
| WO | WO 01/05058 | 1/2001 |

*Primary Examiner*—Nay A Maung
*Assistant Examiner*—Tuan H Nguyen
(74) *Attorney, Agent, or Firm*—Procopio, Cory, Hargreaves & Savitch LLP (57) ABSTRACT

A method for radio communication in a wireless local area network including at least one transceiver equipped with an antenna with a controlled directivity pattern, according to which, in addition to the assignment in advance of the threshold value of communication quality $H_0$ corresponding to the minimum pre-specified communication quality, the current value of communication quality $Q_{cur}$ is periodically determined based on the signal being received, the threshold value of the communication quality $H_{max}$ (corresponding to the pre-specified maximum communication quality) is also additionally assigned in advance. With the current value of communication quality $Q_{cur}$ being grater than or equal to the upper threshold value $H_{max}$, the information exchange is continued, while with the current communication quality value $Q_{cur}$ being less than the upper threshold value $H_{max}$, but greater than or equal to the lowest threshold value $H_0$, the information exchange is also continued and the procedure for the optimization of antenna beam direction is carried out after a pre-specified time interval T.

24 Claims, 9 Drawing Sheets

U.S. PATENT DOCUMENTS

| | | |
|---|---|---|
| 5,873,048 A | 2/1999 | Yun |
| 6,473,036 B2 | 10/2002 | Proctor, Jr. |
| 6,580,394 B2 * | 6/2003 | Wang et al. .................. 342/458 |
| 7,289,826 B1 * | 10/2007 | Hovers et al. ............ 455/562.1 |

* cited by examiner

RADIO COMMUNICATION METHOD IN A WIRELESS LOCAL NETWORK

FIELD OF THE INVENTION

The invention claimed herein refers to wireless local area communication networks (Wireless Local Area Network—WLAN), namely, to methods and equipment used in said networks for the purpose of transmission and reception of various types of information.

RELATED ART

Currently wireless local area communication networks are finding more and more extensive use in the field of information science and videographic communication for the purpose of transmission and distribution of data and other information among multiple users located inside the same area (for example, among personal computers, laptop computers, printers and other users located in the same building without any restrictions on the "mobility" of these devices). Transmission of information with the use of WLAN allows one to reduce network cost because there is no necessity of laying connecting wires. A network of this type can be also used in those cases when it is either difficult or impossible to lay connecting wires and also in cases when there are no socket connectors for local networks due to architectural restrictions. WLAN represents an ideal solution for an institution at which the arrangement of users is often changed. In existing WLANs, radio communication is usually arranged in compliance with known international standards,—for example, such as IEEE 802.11b.

Receiving and transmitting devices (transceivers) used in wireless local networks are more and more often equipped with directional antennas with controlled directivity pattern. Such antennas enable to attain the gain in the range, rate and reliability of information transmission as well as to reduce the power of the transceiver. However, in order to obtain an actual gain from the use of directional antennas with controlled directivity pattern, it is required to optimize the position of the directional antenna from time to time, i.e. to perform the search for the appropriate direction of the antenna beam and the installation of the antenna in such a position, which provides for the highest quality of communication, the said quality being determined based on one or another parameter of the signal being received or based on a set of these parameters.

The performance of steps for the optimization of the directional antenna position takes certain time, during which the process of information transmission is not carried out. A contradiction emerges: for the maintenance of the direction of the antenna beam in a position at which the highest possible communication quality (under particular conditions) is ensured, it is necessary to perform the procedure for the above-mentioned optimization as often as possible, but in order to reduce the influence of the optimization procedure on the process of information exchange, it is desirable that the optimization procedure should be performed as seldom as possible.

A method for information exchange in a wireless local network is known (see European Patent No 1063789, IPC H04B 7/04, publication date Dec. 27, 2000), implying the transmission of a calibration signal by means of an omnidirectional antenna by one transceiver to another transceiver, which receives this signal also by means of an omnidirectional antenna; then the selection (from a multitude of directional antennas of the second transceiver) of the antenna, which ensures the best conditions for signal reception, the transmission of the calibration signal by the second transceiver by m means of the selected antenna (with the said signal serving for the selection of the best directional antenna in terms of the quality of the signal reception of the first transceiver) and the performance of information exchange by means of the directional antennas of the first and the second transceivers selected as a result of the transmission of calibration signals.

The employment of directional antennas in the known method enables to ensure sufficient reliability of radio communication due to the reduction of influence of multibeam interference and signal-fading effect. At the same time the establishment of radio communication at the first stage with the use of the omnidirectional radiation (beam) pattern does not enable to improve the reach range or the range of action of WLAN users as compared to the methods based on the use of omnidirectional antennas for information exchange. Besides, when using the known method, it is necessary to transmit the calibration signal twice before the data packet is transmitted, which increases the duration of transmission of service information.

A method for the optimization of message transmission in a wireless network is known (see U.S. Pat. No. 5,138,327, IPC H04B 7/00, published Aug. 11, 1992), which implies the periodic transmission of the signal, carrying the information on the communication quality, from the base station to the mobile station, the determination by the mobile station of the communication quality at various positions of the directivity patterns of the antennas of the base station and the mobile station, the selection of such positions of directivity patterns of antennas of the base and mobile stations, which ensure the highest communication quality for the transmission of messages.

In the known method the obligatory periodic procedure for optimization of antenna beam direction of the base and mobile stations is performed, irrespective of the current quality of communication, which procedure unjustifiably increases the time period required for the performance of the said optimization procedure and accordingly decreases the time period, which is spent on the transmission of the messages proper.

A method for radio communication in a telecommunication system consisting of transceivers equipped with directional antennas is known (see U.S. Pat. No. 5,303,240, IPC G01S 3/72, published Apr. 12, 1994), which implies the transmission by one transceiver of the data packet that includes the calibration signal, the determination by the second transceiver of the value of communication quality at different positions of the directivity pattern of the antenna and the selection of the antenna position, which ensures the highest communication quality, subsequent reception of data packets and determination of communication quality during the reception of each data packet, repetition of the procedure for the optimization of antenna beam direction at the deterioration of communication quality to the level, which is lower than the pre-specified threshold value.

In the known method for radio communication, the value of the communication quality is not determined during the transmission of information, which may lead to the loss of a portion of information as a result of the deterioration of quality of communication during data transmission.

The closest to the invention claimed herein in terms of the set of essential features is the method for the exchange of information in a wireless network (See U.S. Pat. No. 6,473,036, IPC H01Q 3/24, published Oct. 29, 2002), consisting of base station and mobile stations equipped with antennas with a controlled directivity pattern. According to the said method, the mobile stations perform the procedure for the optimization of antenna beam direction during the pauses between the reception of data packets, in order to ensure the communication quality at such a level, which is not lower than the pre-specified threshold value.

When using the known method for the information exchange, the value of communication quality is not determined during the transmission of information, which may lead to the loss of a portion of the information as a result of deterioration of the communication quality in the course of data transmission. At the same time, if the acceptable communication quality is retained, the performance of the procedure for the optimization of antenna beam direction during each pause between the receptions of data packets may turn out to be excessive. As a result, the time period spent on the procedure for the optimization of antenna beam direction is unjustifiably increased and the time period spent on the transmission of messages proper is decreased accordingly.

SUMMARY OF THE INVENTION

The task of the invention claimed herein consisted in the development of such a method for radio communication in a wireless local network, which would ensure the decrease of the influence of the procedure for the optimization of antenna beam direction on the process of information transmission owing to the selection of the optimal time interval T between the successive procedures for the said optimization.

The task formulated above was accomplished due to the fact that in the method for radio communication in a wireless local network including at least one transceiver equipped with an antenna with a controlled directivity pattern, in which in the process of information exchange with any transceiver from the said network, a threshold value of communication quality H0( ) is pre-specified in advance with the aid of the said transceiver (with said threshold value corresponding to the pre-specified minimal quality of communication), the current value of communication quality Qcur is periodically determined based on the signal being received, and when the current value of communication quality is less than the threshold value H0, the procedure for the optimization of the antenna beam direction is performed until the current value of the communication quality becomes equal to or exceeds the threshold value H0. According to the invention, the upper threshold value of the communication quality Hmax is additionally assigned in advance (with this value corresponding to the assigned maximum communication quality). When the current value of communication quality Qcur is greater than or equal to the upper threshold value of communication quality Hmax, the performance of information exchange is continued, while when the current value of communication quality Qcur is lower than the upper threshold value Hmax, but greater than or equal to the lowest threshold value H0, the performance of information exchange is continued, and in this case after the assigned time interval T the next procedure for the optimization of the antenna beam direction is performed.

When the radio communication is performed based on the method claimed herein, the current value of the communication quality Qcur is compared not only with the bottom assigned threshold value H0 (as done in the prototype method), but also with the upper assigned threshold value Hmax. Depending on the fact, in which zone the current value of the communication quality Qcur is, the next procedure for the optimization of antenna beam direction is either not performed at all (with Qcur≧Hmax), or the next procedure for the optimization of antenna beam direction is performed after an assigned time interval T (with Hmax>Qcur≧H0), or the procedure for the optimization of antenna beam direction is started immediately after the comparison of the current value of communication quality Qcur with the threshold value of H0 (with Qcur<H0). As a result, the proportion of time spent on the procedures of the optimization of antenna beam direction is decreased, thus increasing the proportion of time spent on the transmission of useful information.

For the period of optimization of antenna beam direction the transmission of information may be stopped.

For the period of optimization of antenna beam direction the reception of information may be stopped.

The process for the optimization of antenna beam direction may be performed in the following way. The direction of the antenna beam is changed at least once, the communication quality for each new direction of the antenna beam is determined, the values of communication quality obtained at various directions of antenna beam are then compared, the highest value of communication quality is identified (among the values obtained at various directions of the antenna beam) and is then memorized as a current communication quality value Qcur. Correspondingly, the direction of the antenna beam is assumed to be the current value for a given transceiver by switching-over of the antenna to this direction.

The direction of the antenna beam may be changed by the azimuth bearing or elevation angle, in this case its direction may be changed by switching-over the directivity pattern of the antenna. The change of the direction of the antenna beam may be also performed according to any other known procedure.

Further decrease of the influence of the procedure for the optimization of antenna beam direction on the process of information transmission may be attained, if during the next determination of the current value of communication quality $Q_{cur}$ it is additionally compared with at least one assigned intermediate threshold value $H_j$, complying with the correlation: $H_0 < H_j < H_{max}$, where j=1, 2, 3 ... N. In this case one of the threshold values $H_0$, $H_j$ or $H_{max}$ is selected and memorized as a current threshold value $H_{cur(i)}$ (where i—the number of the step for the determination of the current value of the communication quality $Q_{cur}$ from the beginning of the functioning of the transceiver), which is the closest from above or closest from below to the current value of communication quality $Q_{cur}$.

According to one of the variants, the variation of the time interval T is performed taking into account the value of the communication quality $Q_{cur}$, namely, time interval T is decreased if in the course of the next determination of the current communication quality value $Q_{cur}$ the value of the current threshold $H_{cur(i)}$ decreases, and time interval T is increased if in the course of the next determination of the current communication quality value $Q_{cur}$ the value of the current threshold $H_{cur(i)}$ increases in comparison to the memorized previous value of $H_{cur(i-1)}$.

According to the second variant the change of time interval T is performed taking into account the state of the environment, namely: in the case of retention of the value of $H_{cur(i)}$ after the next determination of the current communication quality value $Q_{cur}$, the pre-specified time interval T is increased, while in the case of variation of the value $H_{cur(i)}$ (increasing or decreasing) after the next determination of the current value of communication quality $Q_{cur}$, the pre-specified time interval T is decreased.

If on the expiry of time T, the value of $H_{cur(i)}$ remains the same, then according to the other aspect of the invention, the next procedure for the optimization of the antenna beam direction may be omitted.

During the performance of the above-indicated procedures, the changes of time T predetermine its limiting values. When the time interval T is decreased, it is compared with the assigned in advance minimum value of $T_{min}$ and with T being equal to or less than $T_{min}$, the time interval T is assigned as equal to the value of $T_{min}$. When the time interval T is increased, it is compared with the assigned in advance maximum value of $T_{max}$ and with T being greater than or equal to $T_{max}$, the time interval T is assigned as equal to the value of $T_{max}$. In this case the maximum time interval $T_{max}$ may be assigned, upon the attainment of which the compulsory optimization of the antenna beam direction is performed.

The communication quality may be determined at least by one parameter of the signal being received. For example, as a parameter of the received signal it is possible to measure the level of the signal received, the ratio of the level of the signal received to the level of noise, error ratio, the relation of the level of the signal received to the level of distortions, other known parameters of the signal and combinations of such parameters.

BRIEF DESCRIPTION OF THE DRAWINGS

The invention claimed herein is illustrated with the following graphical materials.

DETAILED DESCRIPTION OF THE EMBODIMENTS

Figure 1:
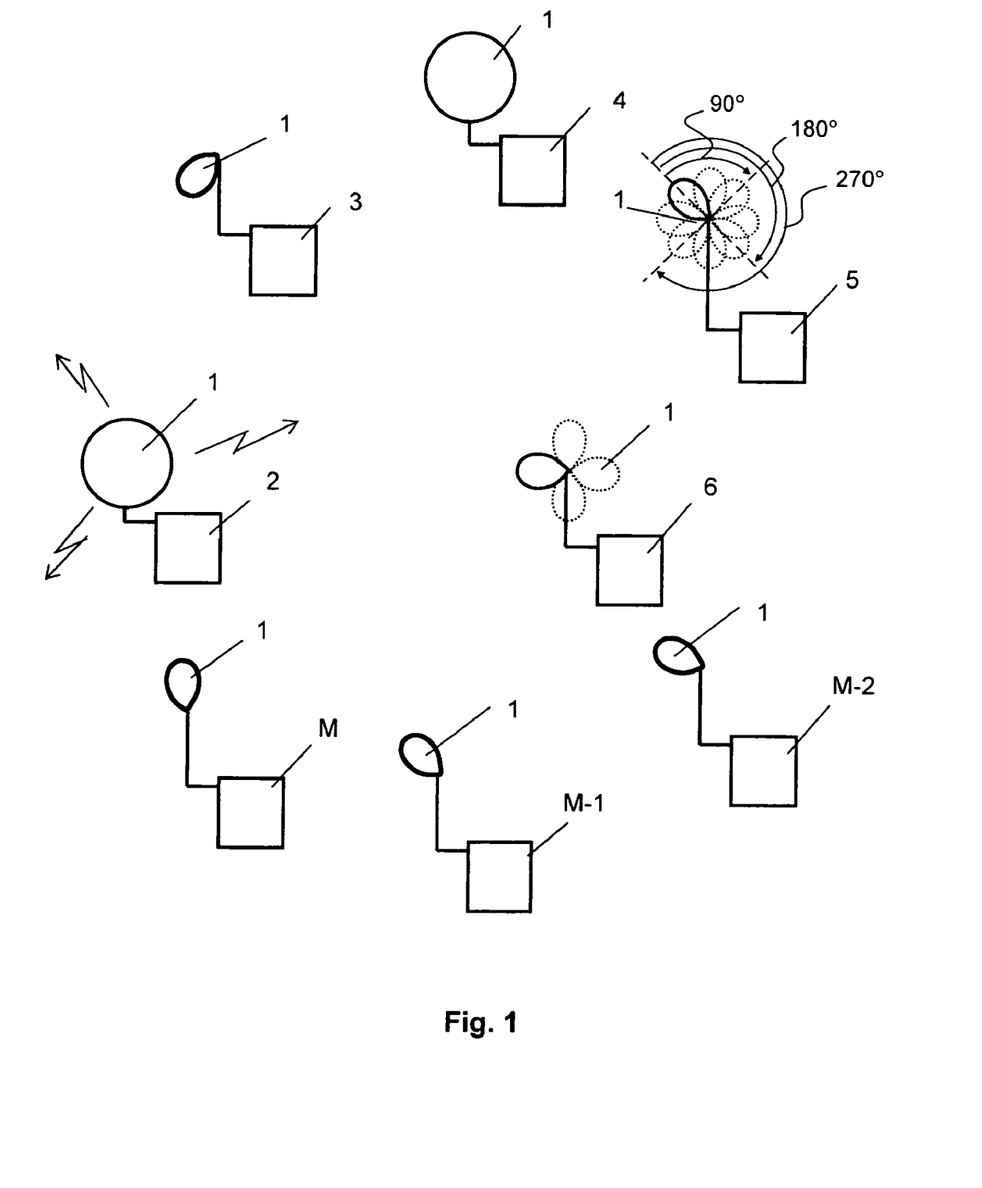
FIG. 1 schematically shows the wireless local network, in which the radio communication is performed by the method claimed herein.

The radio communication method claimed herein may be implemented in a wireless local network shown in FIG. 1. Wireless local network is comprised of transceivers 2, 3, 4, 5, 6, ... M equipped with antennas 1 in such a way that at least one of the said transceivers is equipped with an antenna with a controlled directivity pattern. The threshold value of communication quality $H_{max}$ and the threshold value of the communication quality $H_0$ are initially assigned during the information exchange, for example, between transceivers 2 and 5.

The value $H_{max}$ is assigned depending on the fact, according to which international standard the functioning of WLAN proceeds (IEEE 802.11, IEEE 802.11a, IEEE 802.11b and ISO 8802-11, HIPELAN of type 2). Besides, the a priori statistic data on the communication quality under the actual operation conditions of a particular network are also taken into account. The value of $H_{max}$ usually corresponds to the communication quality level, at which the error ratio is less than the assigned value predetermined by the requirements to the reliability of data transmission.

The value of $H_0$ is determined based on the assigned minimum communication quality, at which it is still possible to perform the radio communication without information loss. $H_0$ usually corresponds to the communication quality level, at which the error ratio is equal to the boundary value allowed by the requirements to the reliability of data transmission.

It is possible to assign the boundary values of communication quality $H_{max}$ and $H_0$, taking into account the requirements of the used network exchange protocols—for instance, the said values may be assigned in such a way that the acceptable level of connection reliability according to TCP protocol, would be provided for.

Figure 2:
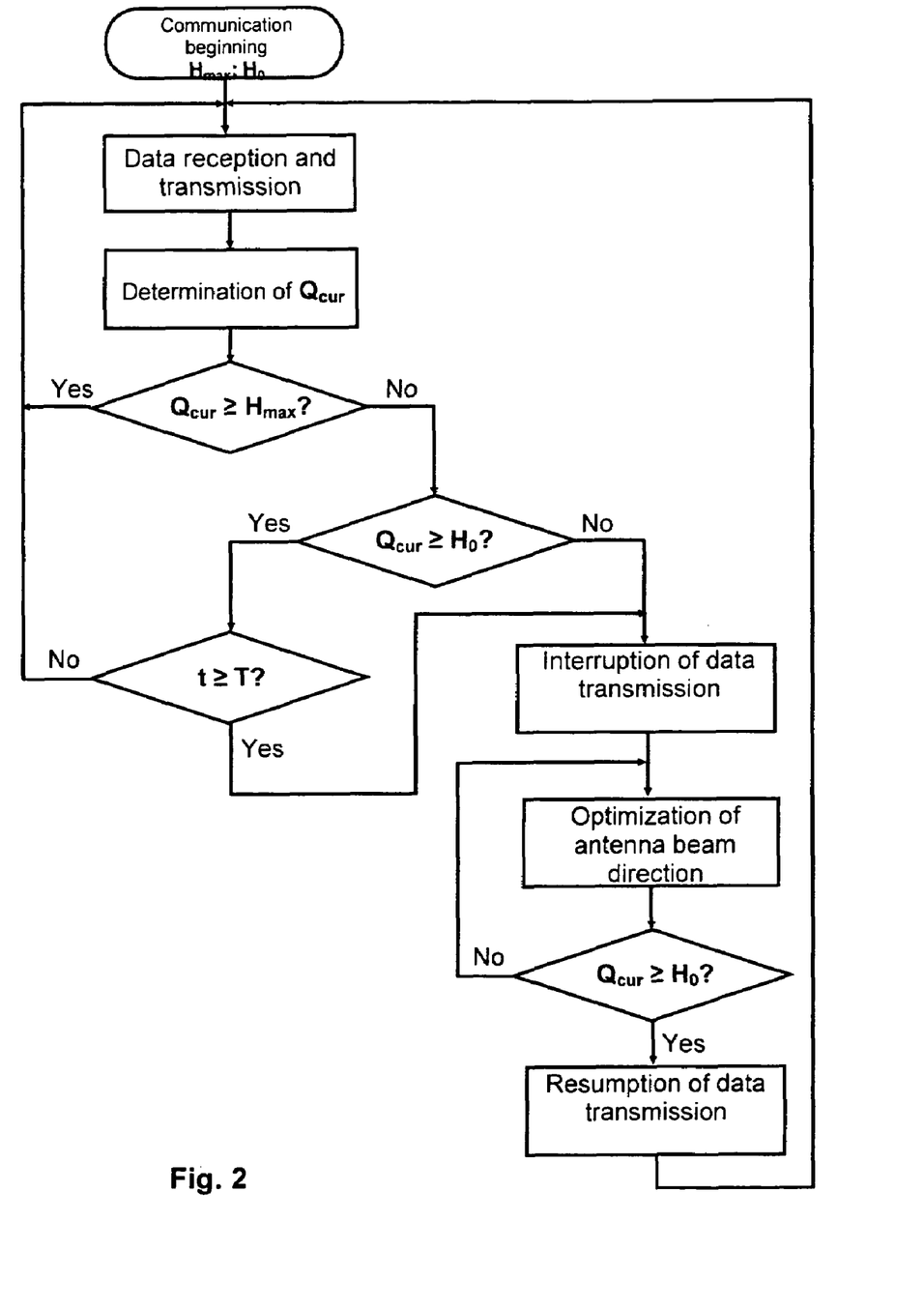
FIG. 2 and FIG. 3 show the examples of possible sequences of steps performed by a transceiver during the radio communication according to the method claimed herein with the assignment of two threshold values of communication quality $H_{max}$ and $H_0$.
Figure 3:
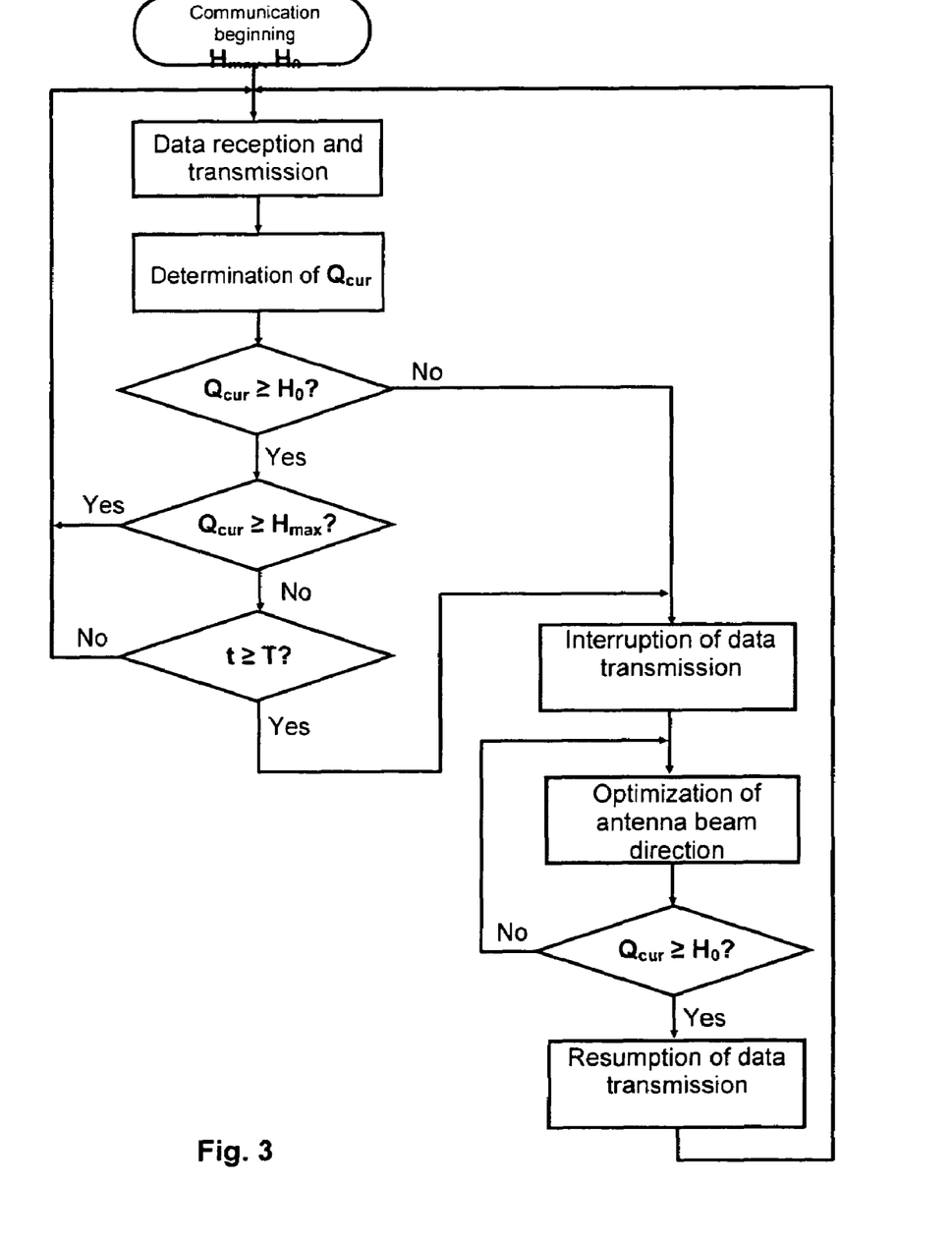

Then the transceiver, for example transceiver 5, periodically determines the current value of the communication quality $Q_{cur}$ based on the signal being received and performs the comparison of the obtained value of $Q_{cur}$ with the threshold values of $H_{max}$ and $H_0$ (see FIG. 2, which shows the sequence of steps, with which $Q_{cur}$ is first compared with $H_{max}$, and then with $H_0$, and FIG. 3, which shows the sequence of steps, with which $Q_{cur}$ is first compared with $H_0$, and then with $H_{max}$). Transceiver 5 determines the communication quality at least based on one parameter of the signal being received; with such parameter to be measured being the error ratio, the level of the signal being received, the relation of the level of the signal being received to the level of noise or distortions and any other known parameters of the signal.

With the current value of the communication quality $Q_{cur}$ being equal to or greater than the value of $H_{max}$, the reception and transmission of information is continued without the performance of the optimization of the antenna beam direction.

With the current value of communication quality $Q_{cur}$ being less than $H_0$, transceiver 5 starts the process of optimization of antenna beam direction of antenna 1, which is repeated by the transceiver until the current value of communication quality $Q_{cur}$ turns out to be equal to or greater than $H_0$. Transceiver 5 usually performs the optimization of the antenna beam of antenna 1 in the following way. It changes the direction of the antenna beam once or several times, determining the communication quality value for each new direction of the antenna beam. Then it compares the values obtained for different directions of the antenna beam, identifying the highest values among all communication quality values obtained at different directions of antenna beam and memorizes it as a current communication quality value $Q_{cur}$, and this direction is memorized as a current direction for the transceiver, with which the information exchange is to be performed.

The transmission of information by transceiver 5 may be stopped for the period of the performance of the procedure for the optimization of antenna beam direction in order to avoid the loss of data transmitted by transceiver 5 at non-optimum positions of the antenna beam. The reception of information by transceiver 5 may also be stopped for this period in order to avoid the loss of the data received.

The direction of the antenna beam is changed either by the azimuth bearing or by the elevation angle depending on the positioning in space of transceiver 2, with which in this particular case transceiver 5 conducts a communication session.

The direction of the antenna beam of antenna 1 of transceiver 5 may be changed by step-by-step switching-over or by continuous changing of the position of the directivity pattern of antenna 1.

With the current value of communication quality $Q_{cur}$ being less than the threshold value $H_{max}$, but greater than or equal to the threshold value of $H_0$, transceiver 5 continues carrying out the transmission and reception of information during the pre-assigned time interval T; upon the expiration of this interval, it starts the optimization of the antenna beam direction, as described above.

The value of time interval T depends on the external conditions of information exchange (being formed) in a particular local network and may take any value within the range from hundredths of a second to dozens of seconds.

One or several intermediate threshold values of communication quality $H_j$, complying with the correlation: $H_0 < H_j < H_{max}$, where j-1, 2, . . . N, may be additionally assigned (in addition to the boundary values of the communication quality $H_{max}$ and $H_0$) in order to obtain the greatest effect from the use of the method for information exchange claimed herein; in this case the current communication quality is additionally compared with $H_j$.

Intermediate threshold values of the communication quality $H_j$ may be selected based, for example, on the required error ratio at various rates of data transmission.

In this case one of the values $H_{max}$, $H_j$ or $H_0$, which is the closest value from above or the closest value from below to the current communication quality value $Q_{cur}$, is assumed and memorized as a current threshold value $H_{cur(i)}$.

If after the next determination of the current communication quality $Q_{cur}$, the value of current threshold $H_{cur(i)}$ is not changed or increased as compared to the memorized previous value, it is possible either to increase the time interval T ($T_i = T_{i-1} + \Delta T$, where i—the number of the step for the determination of the current value of communication quality $Q_{cur}$ starting from the beginning of the functioning of transceiver 5), or to omit the next procedure for the optimization of the antenna beam direction ($T_i = T + iT$).

In another variant of the implementation of the method claimed herein, it is possible to decrease the time interval T ($T_i = T_{i-1} - \Delta T$), if during the next determination of the communication quality $Q_{cur}$, the value of the current threshold $H_{cur(i)}$ is changed in comparison to the memorized previous value of it.

When the time interval T between the successive procedures of optimization of antenna beam direction is increased, it is possible to additionally compare the current time interval $T_i$ with the assigned in advance maximum time interval $T_{max}$ between the successive optimization procedures and with $T_i \geq T_{max}$, this procedure should be compulsory started. The comparison of $T_i$ with $T_{max}$ enables to avoid the undesirable excessive increase of the current time interval $T_i$.

Similarly, with the decrease of the time interval T between the successive procedures for the optimization of the antenna beam direction, it is possible to additionally compare the current time interval $T_i$ with the assigned in advance minimum time interval $T_{min}$ between the successive procedures for the optimization of the antenna beam direction, and with $T_i \leq T_{min}$, this procedure should be compulsory started. The comparison of $T_i$ with $T_{min}$ enables to avoid the undesirable excessive decrease of the current time interval $T_i$.

Examples of the implementation of the method for radio communication in a wireless local network claimed herein are presented below.

EXAMPLE 1

See FIG. 2

A threshold value of communication quality $H_{max}=10$ dB and threshold value of $H_0=3$ dB are initially assigned for the transceivers of the wireless local network functioning in accordance with international standard IEEE 802.11 based on the actual conditions of functioning of these devices. Communication quality in this example was determined as a ratio of the level of the signal being received to the level of noise.

Transceiver, for example transceiver 5 (see FIG. 1) carrying out the reception and transmission of information periodically, for example, every 0.1 s determines the current value of communication quality $Q_{cur}$ based on the signal being received. Then the transceiver performs the comparison of the obtained value $Q_{cur}$ with the pre-assigned threshold value $H_{max}$. If the current value of communication quality $Q_{cur}$ is equal to or greater than $H_{max}$ (for example, $Q_{cur}=40$ dB), the transceiver continues the reception and transmission of information without conducting the procedure for the optimization of antenna beam direction.

If the current value of communication quality $Q_{cur}$ turns out to be less than $H_{max}$ (for example, $Q_{cur}=5$ dB), the transceiver then performs the comparison of $Q_{cur}$ with $H_0$.

With $Q_{cur}$ being less than $H_0$ (for example, $Q_{cur}=1$ dB), the transceiver interrupts the transmission of information and starts the procedure for the optimization of antenna beam direction, during which the transceiver changes the direction of the antenna beam one or several times determining the communication quality value for each new direction of the antenna beam. Depending on the location (in space) of another transceiver, with which the transceiver performs the communication session, the direction of the antenna beam is changed either by azimuth bearing or by elevation angle. The direction of the antenna beam of antenna 1 of the transceiver may be changed by step-by-step switching-over or by continuous changing of the position of the directivity pattern of antenna 1.

For example, the direction of the antenna beam is changed 3 times by 90°, at this $Q_{90}=3$, $Q_{180}=8$, $Q_{270}=14$. The values $Q_{90}$, $Q_{180}$ and $Q_{270}$, obtained for different directions of the antenna beam, are compared with one another and the highest value among all communication quality values obtained for different directions of the antenna beam is identified (in our case this is $Q_{270}$). If this value $Q_{270}$ turns out to be equal to or greater than $H_0$, (as in our case), then the transceiver memorizes it as a current communication quality value $Q_{cur}$, while the direction of the antenna beam is memorized as a current direction for the transceiver, with which the information exchange is being conducted. If the highest value of Q (measured for different directions of the antenna beam) turns out to be less than $H_0$, the procedure for the optimization of the antenna beam is repeated until the highest of the measured values turns out to be greater than or equal to $H_0$.

With $Q_{cur}$ being greater than or equal to $H_0$ (for example, $Q_{cur}=8$ dB), the transceiver performs the comparison of time t, which has expired since the completion of the previous procedure for the optimization of antenna beam direction, with the pre-assigned time interval T between two successive optimization procedures (for example, T=1 s). If the time of the next optimization has not come yet, the transceiver continues the reception and the transmission of information and after the expiration of the pre-assigned time interval T it performs the next procedure for the optimization of the antenna beam direction.

The steps described above are repeated at every next determination of $Q_{cur}$. Thus, one of the three operation modes of the transceiver is selected depending on the value of $Q_{cur}$, namely: with $Q_{cur} \geq H_{max}$, the reception and transmission of information is conducted without the performance of the optimization of antenna beam direction, with $H_{max} > Q_{cur} \geq H_0$, time interval T is assigned between the successive procedures for the optimization of antenna beam direction, or with $Q_{cur} < H_0$, the procedure for the optimization of antenna beam direction is started without delay.

EXAMPLE 2

See FIG. 3

Threshold values of communication quality $H_{max}=40$ dB and $H_0=5$ dB are initially assigned to the transceivers of the wireless local network functioning in accordance with international standard IEEE 802.11a, based on the actual conditions of functioning of these devices. The communication quality in this example was initially determined as the ratio of the level of the signal being received to the level of interference.

Then, the transceiver (that conducts the reception and transmission of data) performs the same steps as in example 1, but the comparison of $Q_{cur}$ with the threshold value of communication quality $H_0$ is performed first and then (with $Q_{cur} > H_0$) the comparison with $H_{max}$ is performed.

EXAMPLE 3

Figure 4:
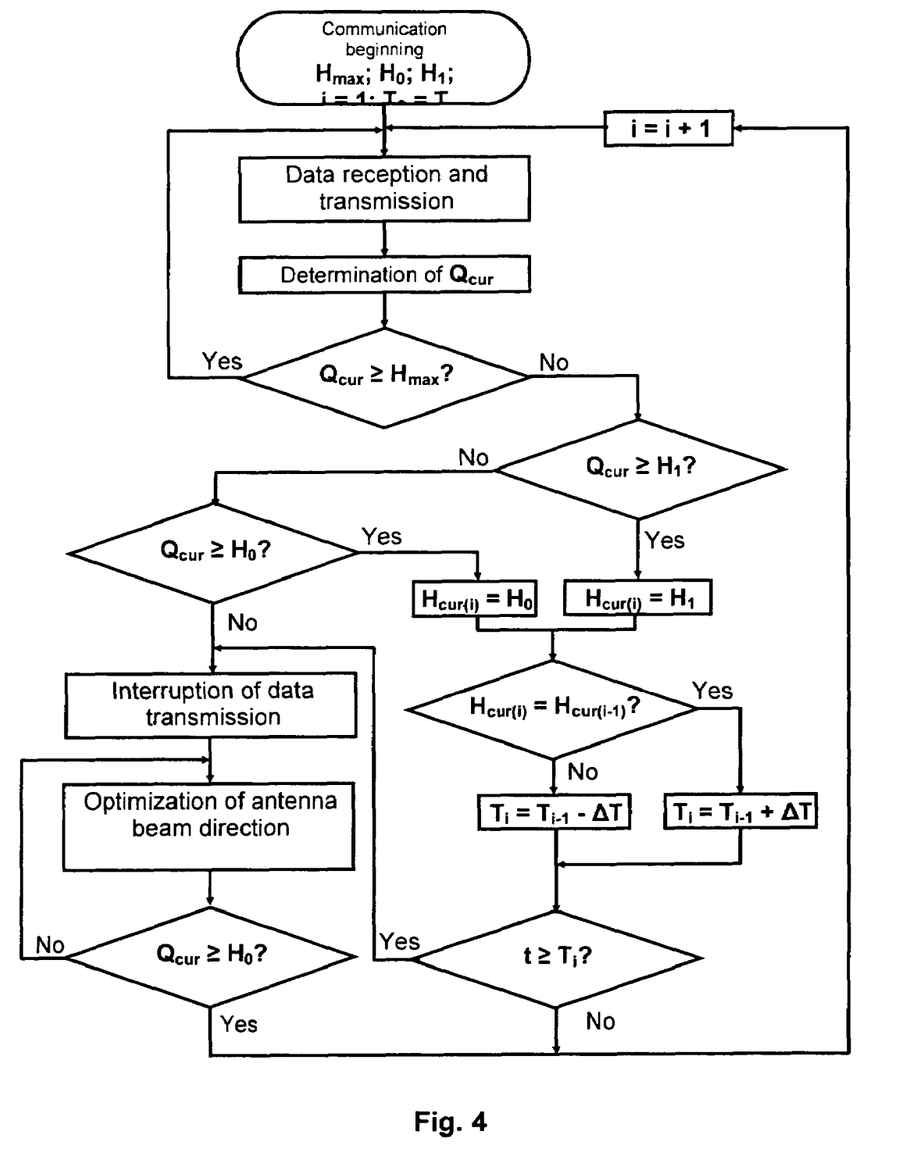
FIG. 4-FIG. 7 show the examples of possible sequences of steps performed by a transceiver during the radio communication according to the method claimed herein with the additional assignment of one intermediate threshold value of communication quality $H_1$ and the determination of the current threshold value $H_{cur(i)}$.

See FIG. 4

Threshold values of communication quality $H_{max}=10^{-7}$, $H_0=10^{-4}$ and one intermediate threshold value of communication quality $H_1=10^{-5}$, complying to the correlation: $H_0 < H_1 < H_{max}$ (in this case N=1) are initially assigned to the transceivers of the wireless local network functioning in accordance with international standard IEEE 802.11b in the form of error ratio. The initial time interval between the successive procedures for the optimization of the antenna beam $T_0=0.1$ s is also assigned. The error ratio (showing for what number of information bits there is one error) was accepted as a communication quality parameter in this example.

Based on the signal being received, the transceiver (that conducts the reception and transmission of information) periodically determines the current value of communication quality $Q_{cur}$, for example, every 0.1 s. Then the transceiver carries out the comparison of the obtained value $Q_{cur}$ with the pre-assigned threshold value $H_{max}$.

If the current value of communication quality $Q_{cur}$ is equal to or turns out to be greater than $H_{max}$ (for example, $Q_{cur}=10^{-8}$), the transceiver continues the reception and the transmission of the data without conducting the procedure for the optimization of antenna beam direction.

If the current communication quality value $Q_{cur}$ turns out to be less than $H_{max}$ (for example, $Q_{cur}=5 \cdot 10^{-5}$), the transceiver then performs the comparison of $Q_{cur}$ with $H_1$.

With $Q_{cur}$ being less than $H_1$, the transceiver then performs the comparison of $Q_{cur}$ with $H_0$.

If it turned out as a result of the comparison that $Q_{cur}$ is less than $H_0$ (for example, $Q_{cur}=3 \cdot 10^{-4}$), the transceiver performs the same steps for the optimization of antenna beam direction as in Example 1 with $Q_{cur} < H_0$.

With $Q_{cur}$ being greater than or equal to $H_0$ (for example, $Q_{cur}=5 \cdot 10^{-5}$, as it was assumed above), the transceiver receives and memorizes the lesser value closest to $H_0$ as a current threshold value $H_{cur(i)}$.

With $Q_{cur}$ being greater than $H_1$ (for example, $Q_{cur}=5 \cdot 10^{-6}$), the transceiver receives and memorizes the value of $H_1$ as a current threshold value $H_{cur(i)}$.

Then the transceiver compares the current threshold value $H_{cur(i)}$ with the current threshold value $H_{cur(i-1)}$, found out during the previous determination of $Q_{cur}$.

If the current threshold value of $H_{cur(i)}$ remained the same (which means that the operating conditions in the network are stable), the time interval T between two successive optimization procedures, initially equal to 0.1 s, is increased by the value $\Delta T$, for example, by 0.01 s ($T_i = T_{i-1} + \Delta T$, where i—the number of the step for the determination of the current value of communication quality $Q_{cur}$ starting from the beginning of operation of the transceiver).

With the change of the current threshold value $H_{cur(i)}$ as compared to the preceding value of $H_{cur(i-1)}$ (which means that the operating conditions in the network are unstable), the time interval T between two successive optimization procedures is reduced by the value $\Delta T$.

If the time for the next optimization has not come yet, the transceiver continues the reception and the transmission of information and at the expiration of the pre-assigned time interval $T_i$ it performs the next procedure for the optimization of antenna beam direction.

The steps described above are repeated at every next determination of $Q_{cur}$.

EXAMPLE 4

Figure 5:
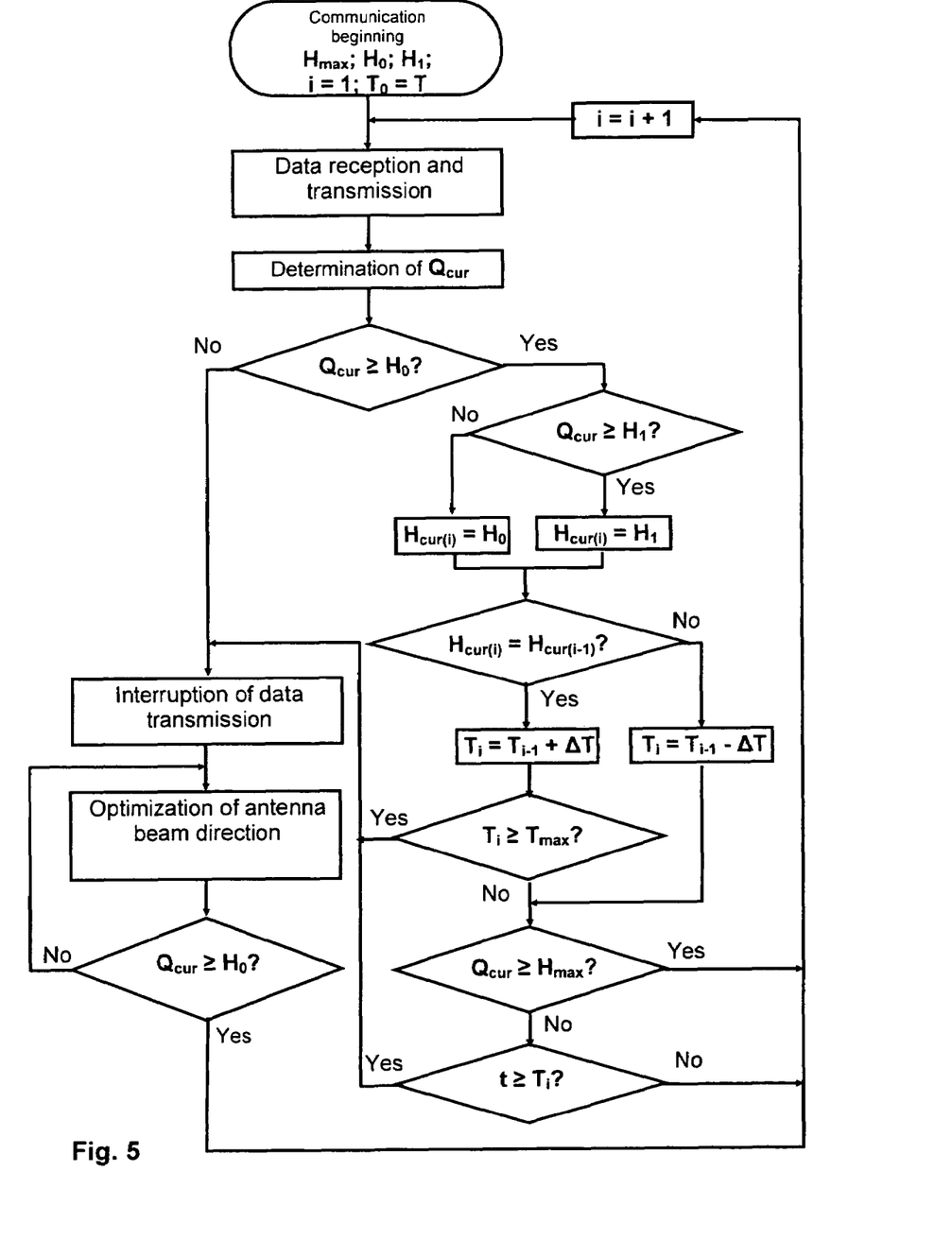

See FIG. 5

Threshold values of communication quality $H_{max}=15$ dB, $H_0=4$ dB and one intermediate threshold value of communication quality $H_1=7$ dB, complying with the correlation: $H_0 < H_1 < H_{max}$ (in this case N=1) are initially assigned to the transceivers of the wireless local network functioning in accordance with international standard IEEE 802.11b, and the maximum acceptable time interval between the successive procedures for the optimization of antenna beam direction $T_{max}$, for example, equal to 10 s is also assigned.

The transceiver (that conducts the reception and the transmission of the data) performs the same steps as in Example 3, but first it performs the comparison of $Q_{cur}$ with the threshold value $H_0$, and then, with $Q_{cur} > H_0$, performs the comparison of $Q_{cur}$ with $H_1$ and additionally (in the case of the increase in the time interval between the successive optimization procedures) compares this increased time interval with the maximum acceptable value $T_{max}$.

EXAMPLE 5

Figure 6:
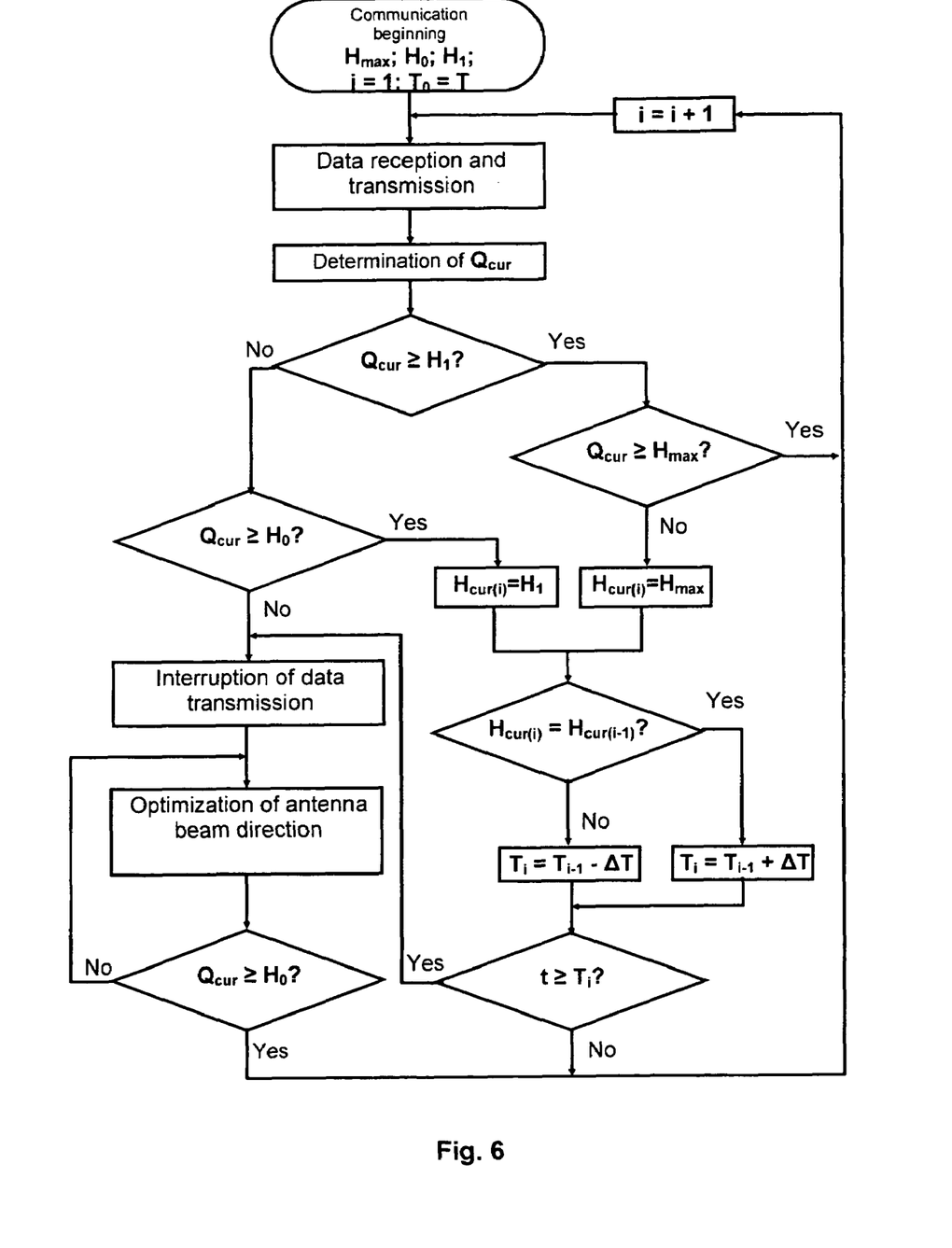

See FIG. 6

Threshold values of communication quality $H_{max}=13$ dB, $H_0=4$ dB and one intermediate threshold value of communication quality $H_1=7$ dB, complying with the correlation: $H_0 < H_1 < H_{max}$ (in this case N=1) are initially assigned to the transceivers of the wireless local network functioning in accordance with international standard IEEE 802.11b, and the initial time interval between the successive procedures for the optimization of antenna beam direction $T_0$ equal to 0.15 s is also assigned.

Then the transceiver (that conducts the reception and the transmission of the data) performs the same steps as in Example 3, but first it performs the comparison of $Q_{cur}$ with the threshold value of communication quality $H_1$, and then, with $Q_{cur} > H_1$ performs the comparison with $H_{max}$, assumes and memorizes as a current threshold $H_{cur(i)}$ the closest greater threshold value to $H_1$ or $H_{max}$. If, for example, $Q_{cur}$ is equal to 9 dB, $H_{cur(i)}$ is assumed to be equal to the value of $H_{max}$. If, as a result of subsequent measurements, $Q_{cur}$ will be in the interval between $H_1$ and $H_0$ (for example, Qcur turns out to be equal to 6 dB), the value of $H_1$ will be assumed as $H_{cur(i)}$.

EXAMPLE 6

Figure 7:
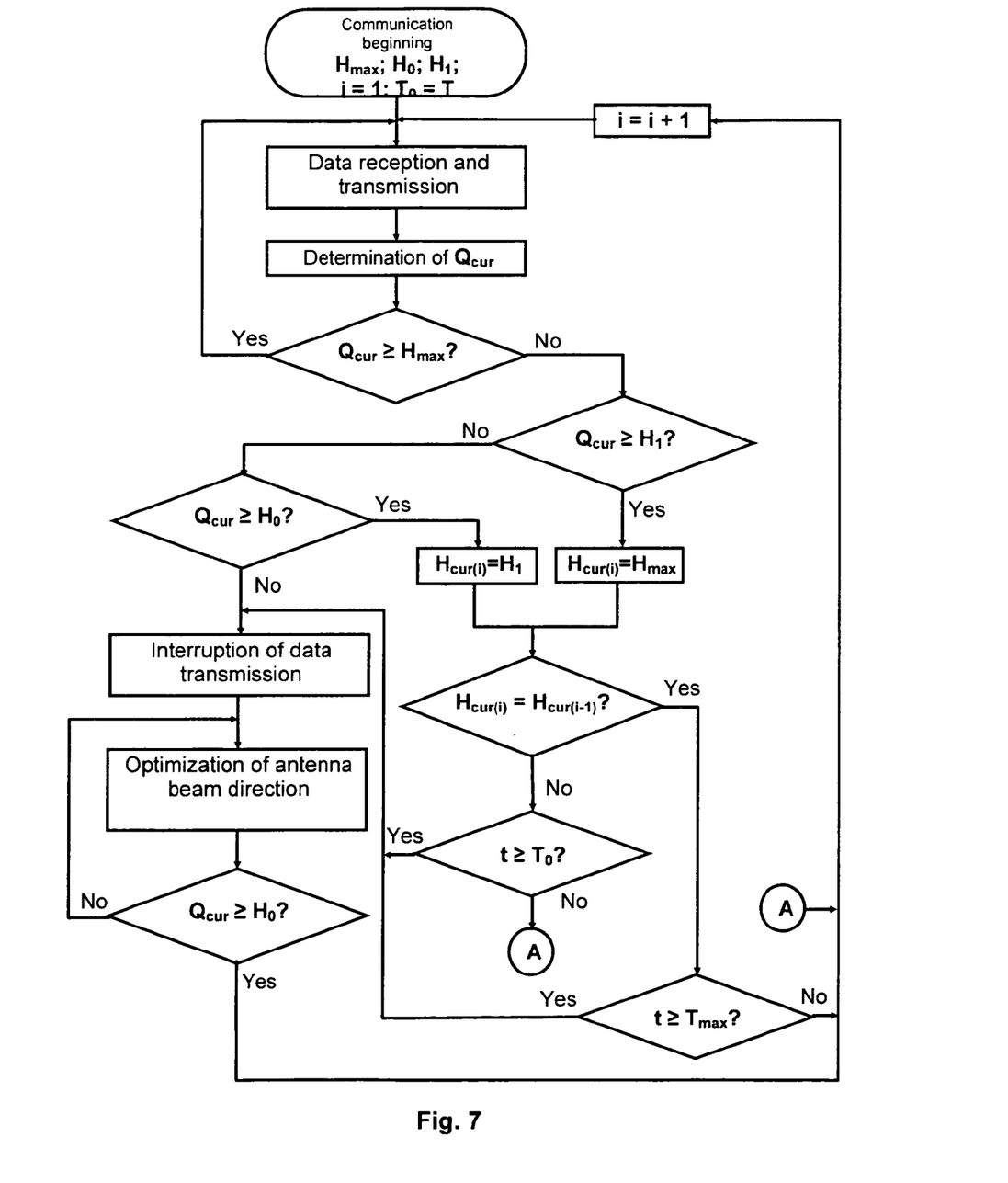

See FIG. 7

Threshold values of communication quality $H_{max}$=12 dB, $H_0$=4 dB and one intermediate threshold value of communication quality $H_1$=6 dB, complying with the correlation: $H_0<H_1<H_{max}$ (in this case N=1) are initially assigned to the transceivers of the wireless local network functioning in accordance with international standard IEEE 802.11a, and the initial time interval between the successive procedures for the optimization of the antenna beam $T_0$ equal to 0.15 s and the maximum interval between the successive procedures for the optimization of the antenna beam $T_{max}$=2 s are also assigned.

The transceiver (that conducts the reception and the transmission of the data) determines the current value of communication quality $Q_{cur}$ periodically, for example, every 0.15 s, based on the signal being received. Then the transceiver performs the comparison of the obtained value of $Q_{cur}$ with the pre-assigned threshold value $H_{max}$. If the current value of communication quality $Q_{cur}$ is equal to or greater than $H_{max}$ (for example, $Q_{cur}$=16 dB), the transceiver continues the reception and the transmission of information without conducting the procedure for the optimization of antenna beam direction.

If the current value of the communication quality $Q_{cur}$ turns out to be less than $H_{max}$ (for example, $Q_{cur}$=5 dB), the transceiver then performs the comparison of $Q_{cur}$ with $H_1$.

With $Q_{cur}$ being less than $H_1$, the transceiver performs the comparison of $Q_{cur}$ with If as a result of the comparison it turned out that $Q_{cur}$ is less than $H_0$ (for example, $Q_{cur}$=3 dB), the transceiver performs the same steps as in the example 1 for the case when $Q_{cur}<H_0$.

With $Q_{cur}$ being greater than or equal to $H_0$ (for example, $Q_{cur}$=5 dB, as it was assumed above), the transceiver receives and memorizes the value $H_1$ as the closest greater current threshold value $H_{cur(i)}$.

With $Q_{cur}$ being greater than $H_1$ (for example, $Q_{cur}$=8 dB), the transceiver receives and memorizes the value $H_{max}$ as the closest greater current threshold value $H_{cur(i)}$.

Then the transceiver compares the current threshold value $H_{cur(i)}$ with the threshold value $H_{cur(i-1)}$ found out as a result of the preceding determination of $Q_{cur}$.

If the threshold value of $H_{cur(i)}$ remains unchanged as a result of next determinations of $Q_{cur}$ (which means that the operating conditions in the network are stable), then the next procedure for the optimization of antenna beam direction is omitted. Under these conditions the procedure for the optimization is performed only after the expiration of time $T_{max}$, which has expired since the performance of the preceding procedure for the optimization of antenna beam direction.

With the changed threshold value $H_{cur(i)}$ as compared to the previous value of $H_{cur(i-1)}$ (which means that the operating conditions in the network are unstable), the next procedure for the optimization of antenna beam direction is performed at the expiration of time $T_0$, which has expired since the instant of completion of the previous optimization.

The steps described above are repeated at every next determination of the $Q_{cur}$ value.

EXAMPLE 7

Figure 8:
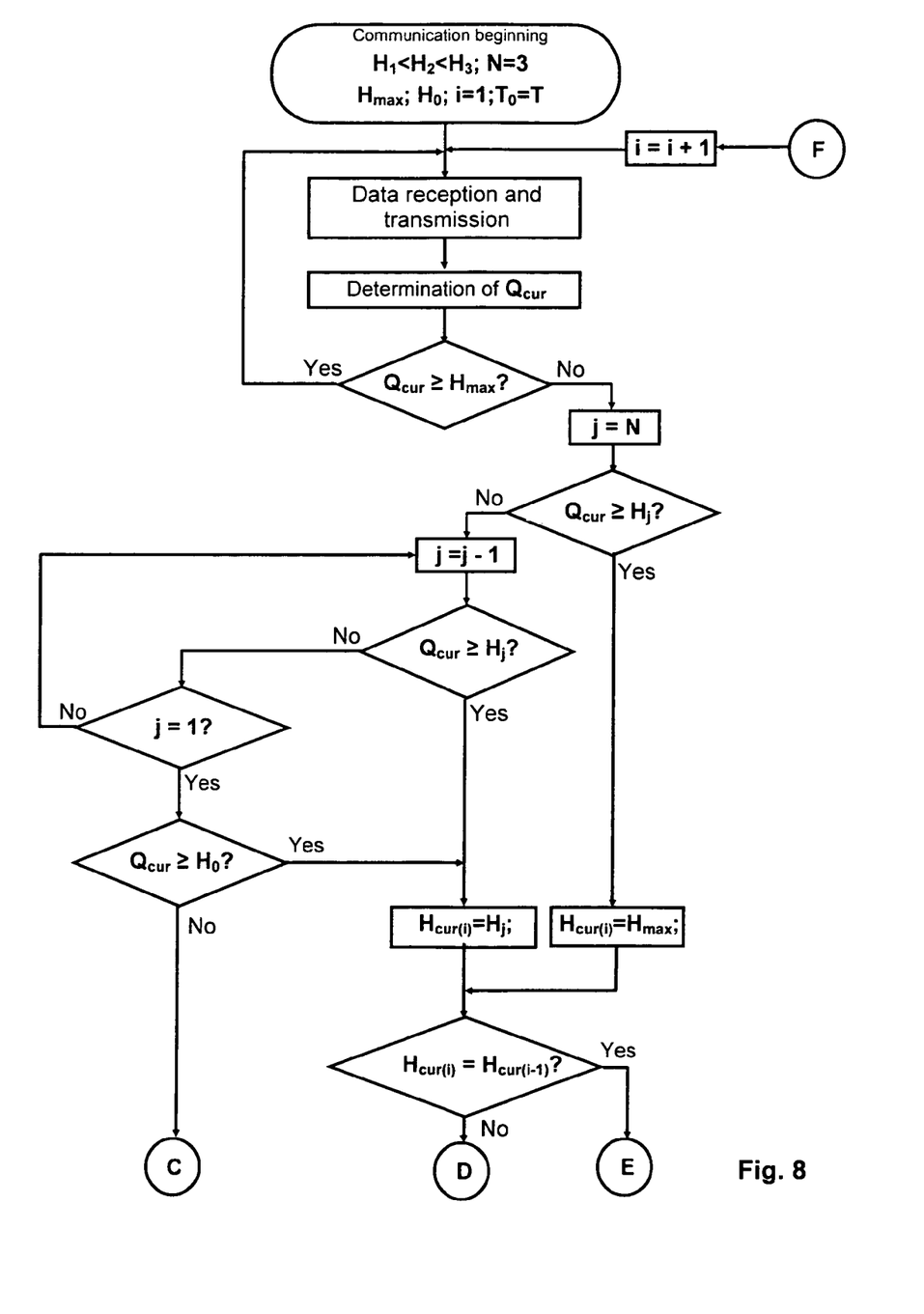
FIG. 8 shows one of the possible sequences of steps performed by a transceiver during the radio communication according to the method claimed herein with the additional assignment of several intermediate threshold values of communication quality $H_1$, $H_2$, $H_3$.
Figure 9:
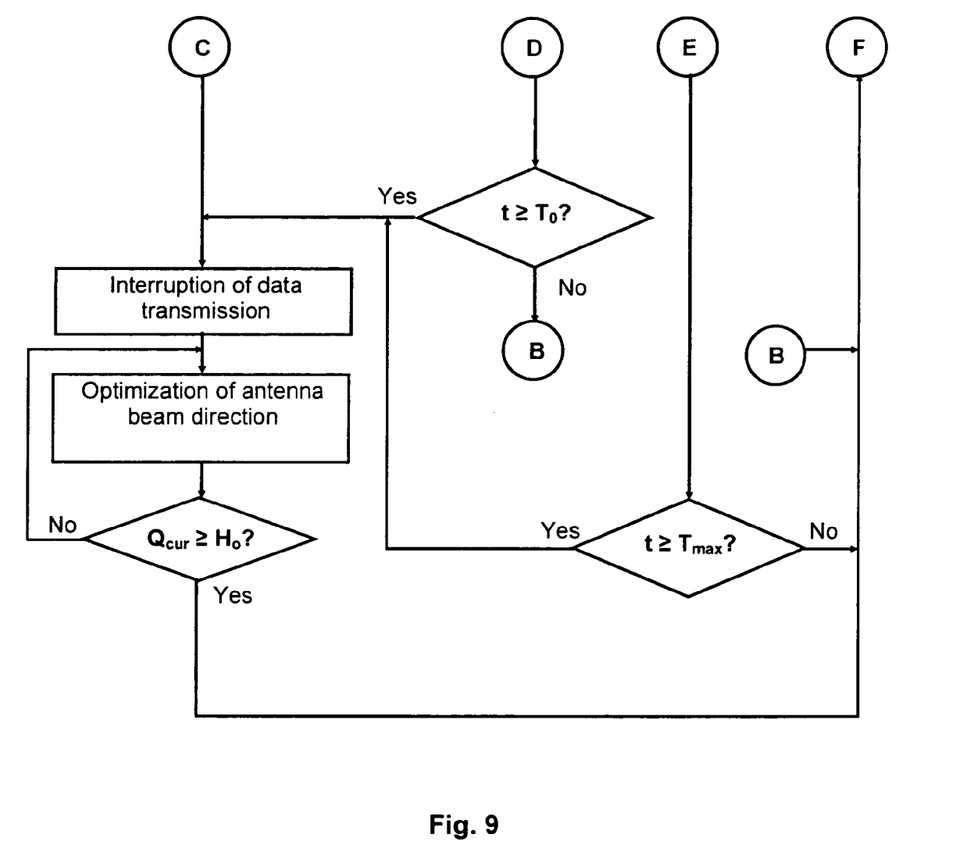
FIG. 9 shows the continuation of the sequence of steps shown in FIG. 8.

See FIG. 8 and FIG. 9

Threshold values of communication quality $H_{max}$=30 dB, $H_0$=5 dB and three intermediate threshold values of communication quality $H_1$=10 dB, $H_2$=15 dB, and $H_3$=10 dB complying with the correlation: $H_0<H_1<H_2<H_3<H_{max}$ (in this case N=3) are initially assigned to the transceivers of the wireless local network functioning in accordance with international standard IEEE 802.11a, as well as the initial time interval between the successive procedures for the optimization of antenna beam $T_0$ equal to 0.15 s and the maximum interval between the successive procedures for the optimization of the antenna beam $T_{max}$ equal to 2 s.

The transceiver (that conducts the reception and the transmission of data) determines the current value of communication quality periodically, for example, every 0.1 s based on the signal being received. Then the transceiver performs the comparison of the obtained value of $Q_{cur}$ with the pre-assigned threshold value $H_{max}$. If the current value of communication quality $Q_{cur}$ is equal to or greater than $H_{max}$ (for example, $Q_{cur}$=35 dB), the transceiver continues the reception and the transmission of the data without conducting the procedure for the optimization of the antenna beam direction.

If the current value of the communication quality $Q_{cur}$ turns out to be less than $H_{max}$ (for example, $Q_{cur}$=8 dB), the transceiver then performs the comparison of $Q_{cur}$ with $H_3$.

With $Q_{cur}$ being less than $H_3$, the transceiver performs the successive comparison of $Q_{cur}$ with $H_2$, $H_1$ and $H_0$.

In the case under consideration ($Q_{cur}$=8 dB), the value, which is the closest greater value to the current communication quality value $Q_{cur}$—i.e. intermediate threshold value $H_1$=10 dB, is assumed as the current threshold value $H_{cur(i)}$.

If it turned out as a result of the comparison that Qcur is less than H0 (for example, Qcur=4 dB), the transceiver performs the same steps as in the example 1 for the case when Qcur<H0.

Then the transceiver compares the current threshold value Hcur(i) with the threshold value Hcur(i−1) determined as a result of the previous determination of Qcur.

If the threshold value of Hcur(i) remains unchanged as a result of regular determinations of Qcur (which means that the operating conditions in the network are stable), the next procedure for optimization of antenna beam direction is omitted. Under these conditions the procedure for the optimization is performed only at the expiration of time Tmax, which has expired since the performance of the previous procedure for the optimization of antenna beam direction.

If the value of the current threshold is changed as compared to the preceding value (which means that the operating conditions in the network are unstable), the next procedure is performed at the expiration of time T0, which has passed since the instant of completion of the previous optimization of the antenna beam.

The steps described above are repeated at every next determination of $Q_{cur}$.

It has to be noted that the examples given above don't exhaust the possible variants for the use of the method of information exchange in the wireless local network claimed herein.

The invention claimed is:

1. A method of operating a wireless transceiver having an antenna, the antenna having more than one antenna pattern, the method comprising:
   determining a current value of communication quality for a transceiver based on a received signal;
   if the current value of communication quality is greater than a maximum threshold value of communication quality, then continuing reception of information and transmission of information;
   if the current value of communication quality is less than a minimum threshold value of communication quality, then interrupting reception of information and transmission of information and starting a procedure for the optimization of the antenna pattern; and if the current value of communication quality is greater than the minimum threshold value of communication quality and less than the maximum threshold value of communication quality, and if a pre-assigned time interval since completion of a previous performance of the procedure for the optimization of the antenna pattern has expired, then interrupting reception of information and transmission of information and starting the procedure for the optimization of the antenna pattern.

2. The method of claim 1, wherein the procedure for the optimization of the antenna pattern includes:

changing the antenna pattern at least one time;

determining a communication quality value at each at least one changing of the antenna pattern;

determining a highest communication quality value among communication quality values determined at each at least one changing of the antenna pattern; and setting the current value of communication quality equal to the highest communication quality value.

3. The method of claim 2, wherein changing the antenna pattern includes at least one of changing an azimuth bearing, changing an elevation angle, and switching-over a directivity pattern.

4. The method of claim 1, wherein the current value of communication quality is determined using at least one parameter included in the received signal.

5. The method of claim 4, wherein the at least one parameter includes at least one of a measurement of a level of the received signal, a measurement of a ratio of a level of the received signal to a level of noise, a measurement of a ratio of a level of the received signal to a level of interference, and a measurement of an error ratio.

6. A method of operating a wireless transceiver having an antenna, the antenna having more than one antenna pattern, the method comprising:

determining a current value of communication quality for a transceiver based on a received signal;

if the current value of communication quality is greater than a maximum threshold value of communication quality, then continuing reception of information and transmission of information;

if the current value of communication quality is less than a minimum threshold value of communication quality, then interrupting reception of information and transmission of information and starting a procedure for the optimization of the antenna pattern;

if the current value of communication quality is greater than the minimum threshold value of communication quality and less than the maximum threshold value of communication quality, then setting a current threshold value to the same value as one of the minimum threshold value of communication quality, the maximum threshold value of communication quality, and an at least one intermediate threshold communication quality value that is greater than the minimum threshold value of communication quality and less than the maximum threshold value of communication quality;

if at the expiration of a pre-assigned time interval since completion of a previous performance of the procedure for the optimization of the antenna pattern the current threshold value is changed from a preceding current threshold value, then starting the procedure for the optimization of the antenna pattern; and if at the expiration of the pre-assigned time interval since completion of the previous performance of the procedure for the optimization of the antenna pattern the current threshold value is unchanged from the preceding current threshold value, then omitting performance of the procedure for the optimization of the antenna pattern.

7. The method of claim 6, wherein if an accumulated time during which the current threshold value has remained unchanged is greater than a pre-assigned maximum time interval, then the pre-assigned time interval is set equal to the pre-assigned maximum time interval.

8. The method of claim 6, wherein the current threshold value is set such that it includes a closest value to the current value of communication quality.

9. The method of claim 6, further comprising changing the pre-assigned time interval.

10. The method of claim 9, wherein:

if the pre-assigned time interval is less than a pre-assigned minimum time interval, then setting the pre-assigned time interval the same as the pre-assigned minimum time interval; and if the pre-assigned time interval is greater than a pre-assigned maximum time interval, then setting the pre-assigned time interval the same as the pre-assigned maximum time interval.

11. A method of operating a wireless transceiver having an antenna, the antenna having a controlled directivity pattern, the method comprising:

determining a current value of communication quality for a transceiver based on a received signal;

if the current value of communication quality is greater than a maximum threshold value of communication quality, then continuing reception of information and transmission of information;

if the current value of communication quality is less than a minimum threshold value of communication quality, then interrupting reception of information and transmission of information and starting a procedure for the optimization of antenna beam direction;

if the current value of communication quality is greater than the minimum threshold value of communication quality and less than the maximum threshold value of communication quality, then setting a current threshold value to one of a plurality of pre-assigned values;

if at the expiration of a pre-assigned time interval since completion of a previous performance of the procedure for the optimization of antenna beam direction the current threshold value is changed from a preceding current threshold value, then starting the procedure for the optimization of antenna beam direction; and if at the expiration of the pre-assigned time interval since completion of the previous performance of the procedure for the optimization of antenna beam direction the current threshold value is unchanged from the preceding current threshold value, then omitting performance of the procedure for the optimization of antenna beam direction.

12. The method of claim 11, wherein the plurality of pre-assigned values includes the minimum threshold value of communication quality, the maximum threshold value of communication quality, and an intermediate threshold communication quality value that is greater than the minimum threshold value of communication quality and less than the maximum threshold value of communication quality.

13. The method of claim 11, wherein the plurality of pre-assigned values includes the minimum threshold value of communication quality, the maximum threshold value of communication quality, and a plurality of intermediate threshold communication quality values that are greater than the minimum threshold value of communication quality and less than the maximum threshold value of communication quality.

14. The method of claim 11, wherein if an accumulated time during which the current threshold value has remained unchanged is greater than a pre-assigned maximum time interval, then the pre-assigned time interval is set the same as the pre-assigned maximum time interval.

15. The method of claim 11, further comprising decreasing the pre-assigned time interval when the current threshold value is changed from the preceding current threshold value.

16. The method of claim 11, further comprising decreasing the pre-assigned time interval when the current threshold value is less than the preceding current threshold value.

17. The method of claim 11, further comprising increasing the pre-assigned time interval when the current threshold value is unchanged from the preceding current threshold value.

18. A method of operating a wireless transceiver having an antenna, the antenna having a controlled directivity pattern, the method comprising:
   determining a current value of communication quality for a transceiver based on a received signal;
   if the current value of communication quality is greater than a maximum threshold value of communication quality, then continuing reception of information and transmission of information; and
   if the current value of communication quality is less than a minimum threshold value of communication quality, then starting a procedure for the optimization of antenna beam direction; and
   if the current value of communication quality is greater than the minimum threshold value of communication quality and less than the maximum threshold value of communication quality, then starting the procedure for the optimization of antenna beam direction at the expiration of a pre-assigned time interval since completion of a previous performance of the procedure for the optimization of antenna beam direction.

19. The method of claim 18, wherein reception of information is interrupted for the duration of the procedure for the optimization of antenna beam direction.

20. The method of claim 18, wherein transmission of information is interrupted for the duration of the procedure for the optimization of antenna beam direction.

21. The method of claim 18, further comprising:
   setting a current threshold value to the same value as one of the minimum threshold value of communication quality, the maximum threshold value of communication quality, and one of a plurality of intermediate threshold communication quality values that are greater than the minimum threshold value of communication quality and less than the maximum threshold value of communication quality; and
   omitting performance of the procedure for the optimization of antenna beam direction if at the expiration of the pre-assigned time interval since completion of the previous performance of the procedure for the optimization of antenna beam direction the current threshold value is unchanged from a preceding current threshold value.

22. The method of claim 21, further comprising:
   decreasing the pre-assigned time interval if the current threshold value is less than the preceding current threshold value;
   increasing the pre-assigned time interval if the current threshold value is greater than the preceding current threshold value; and
   increasing the pre-assigned time interval if the current threshold value is unchanged from the preceding current threshold value.

23. The method of claim 18, wherein setting the current threshold value includes:
   successively comparing the maximum threshold value of communication quality, each one the of plurality of intermediate threshold communication quality values, and the minimum threshold value of communication quality; and
   selecting as the current threshold value a value that is closest to the current value of communication quality.

24. The method of claim 18, wherein the procedure for the optimization of antenna beam direction comprises
   changing the pattern of the antenna at least one time; and
   determining a communication quality value at each at least one changing of the antenna pattern.

* * * * *